United States Patent
Lee et al.

(10) Patent No.: US 8,879,237 B2
(45) Date of Patent: Nov. 4, 2014

(54) MULTILAYER CERAMIC ELECTRONIC COMPONENT AND METHOD OF MANUFACTURING THE SAME

(71) Applicant: Samsung Electro-Mechanics Co., Ltd., Suwon-si (KR)

(72) Inventors: Jin Woo Lee, Suwon-si (KR); Chi Hyoun Ro, Suwon-si (KR); Yoon Hee Lee, Suwon-si (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 124 days.

(21) Appl. No.: 13/720,171

(22) Filed: Dec. 19, 2012

(65) Prior Publication Data

US 2013/0163143 A1 Jun. 27, 2013

(30) Foreign Application Priority Data

Dec. 22, 2011 (KR) .................. 10-2011-0139997

(51) Int. Cl.
*H01G 4/06* (2006.01)
*H01G 4/30* (2006.01)
*H01G 4/008* (2006.01)
*H01G 4/12* (2006.01)

(52) U.S. Cl.
CPC .. *H01G 4/30* (2013.01); *H01G 4/12* (2013.01); *H01G 4/008* (2013.01)
USPC .................. 361/321.2; 361/301.2; 361/301.4; 361/306.1; 361/306.3; 361/321.1

(58) Field of Classification Search
USPC ............... 361/321.2, 303–305, 301.2, 301.4, 361/306.1, 306.3, 311–313, 321.1
See application file for complete search history.

(56) References Cited

U.S. PATENT DOCUMENTS

| | | | |
|---|---|---|---|
| 6,982,862 B2* | 1/2006 | Kobayashii | 361/306.1 |
| 7,042,706 B2* | 5/2006 | Nagai et al. | 361/305 |
| 7,638,010 B2 | 12/2009 | Tokuoka et al. | |
| 7,813,104 B2* | 10/2010 | Nakano et al. | 361/301.4 |
| 7,968,846 B2* | 6/2011 | Talghader et al. | 250/338.1 |
| 8,077,444 B2* | 12/2011 | Osawa | 361/303 |
| 8,259,434 B2* | 9/2012 | Kim et al. | 361/321.2 |

FOREIGN PATENT DOCUMENTS

| | | |
|---|---|---|
| JP | 3940421 B2 | 4/2007 |
| JP | 2010-153720 A | 7/2010 |

\* cited by examiner

*Primary Examiner* — Nguyen T Ha
(74) *Attorney, Agent, or Firm* — McDermott Will & Emery LLP

(57) ABSTRACT

There is provided a multilayer ceramic electronic component, including: a ceramic body having dielectric layers and first and second internal electrodes alternately stacked therein; and first and second external electrodes electrically connected to the first and second internal electrodes and formed at both ends of the ceramic body, wherein the ceramic body includes an effective layer contributing to capacitance formation and a protective layer provided on at least one of upper and lower surfaces of the effective layer, the protective layer including one or more step absorbing layers provided at both ends thereof, so that the multilayer ceramic electronic component can have excellent reliability by reducing defects such as electrode spreading, cracks, delamination and the like.

10 Claims, 2 Drawing Sheets

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2011-0139997 filed on Dec. 22, 2011, in the Korean Intellectual Property Office, the disclosure of which is incorporated herein by reference.

BACKGROUND OF THE INVENTION

1. Field of the Invention

The present invention relates to a multilayer ceramic electronic component in which defects such as electrode spreading, delamination, cracks, and the like are reduced, and a method of manufacturing the same.

2. Description of the Related Art

A multilayer ceramic electronic component includes a plurality of stacked dielectric layers, internal electrodes disposed to face each other with the dielectric layer interposed therebetween, and external electrodes electrically connected to the internal electrodes.

Multilayer ceramic electronic components have been widely used as components for mobile communications devices, such as computers, PDAs, cellular phones, and the like, due to advantages thereof such as compactness, high capacity, and ease of mountability.

Recently, as electronic products have become compact and multi-functional, chip components have also tended to be compact and highly-functional. As a result, the multilayer ceramic electronic component is also required to have a compact size and a higher capacitance.

Generally, in order to manufacture a multilayer ceramic electronic component, ceramic green sheets are prepared, and then a conductive paste is printed on the ceramic green sheets to form internal electrode films. The ceramic green sheets having internal electrodes printed thereon are stacked up to several tens to several hundreds of layers, to form a ceramic laminate. Thereafter, the ceramic laminate is compressed at high temperature and high pressure to form a hard ceramic laminate, which is then subjected to a cutting process to produce a green chip. Thereafter, the green chip is plasticized, sintered, and polished, and then external electrodes are formed thereon, to thereby completely manufacture a multilayer ceramic capacitor.

Recently, as the number of stacked ceramic green sheets has increased, the ceramic green sheets subjected to a lamination process and a compressing process may affect product reliability.

That is, when the ceramic green sheets each including an internal electrode formation part and a non-internal electrode formation part are stacked and then compressed through the application of a predetermined amount of pressure, an internal electrode material moves to an empty space between the printed internal electrodes to thereby cause deformation of the ceramic green sheets and the internal electrodes.

RELATED ART DOCUMENT (Patent Document 1) Japanese Patent No. 3940421

SUMMARY OF THE INVENTION

An aspect of the present invention provides a multilayer ceramic electronic component and a method of manufacturing the same, capable of reducing defects such as non-uniformity in sheet thickness, electrode spreading, cracks, and the like, by forming a step absorbing layer.

According to an aspect of the present invention, there is provided a multilayer ceramic electronic component, including: a ceramic body having dielectric layers and first and second internal electrodes alternately stacked therein; and first and second external electrodes electrically connected to the first and second internal electrodes and formed at both ends of the ceramic body, wherein the ceramic body includes an effective layer contributing to capacitance formation and a protective layer provided on at least one of upper and lower surfaces of the effective layer, the protective layer including one or more step absorbing layers provided at both ends thereof.

The step absorbing layer may have a thickness of 0.5 μm to 3 μm.

A ratio of the number of stacked step adsorbing layers to the number of stacked dielectric layers included in the protective layer may be 0.5 to 1.

The step absorbing layer may be formed in a region of the protective layer corresponding to a margin portion of the effective layer.

The first and second internal electrodes may be formed of at least one selected from the group consisting of copper (Cu), nickel (Ni), silver (Ag), and sliver-palladium (Ag—Pd).

According to another aspect of the present invention, there is provided a method of manufacturing a multilayer ceramic electronic component, the method including: preparing ceramic green sheets; forming internal electrode patterns on the ceramic green sheets by using a conductive metal paste; forming a ceramic body including dielectric layers and first and second internal electrodes by stacking the ceramic green sheets; and forming first and second external electrodes electrically connected to the first and second internal electrodes, wherein the ceramic body includes an effective layer contributing to capacitance formation and a protective layer provided on at least one of upper and lower surfaces of the effective layer, the protective layer including one or more step absorbing layers provided at both ends thereof.

The step absorbing layer may be formed in a region of the protective layer corresponding to a margin portion of the effective layer.

The step absorbing layer may have a thickness of 1 μm to 3 μm.

A ratio of the number of stacked step adsorbing layers to the number of stacked dielectric layers included in the protective layer may be 0.5 to 1.

The conductive metal paste may include at least one selected from the group consisting of copper (Cu), nickel (Ni), silver (Ag), and sliver-palladium (Ag—Pd).

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
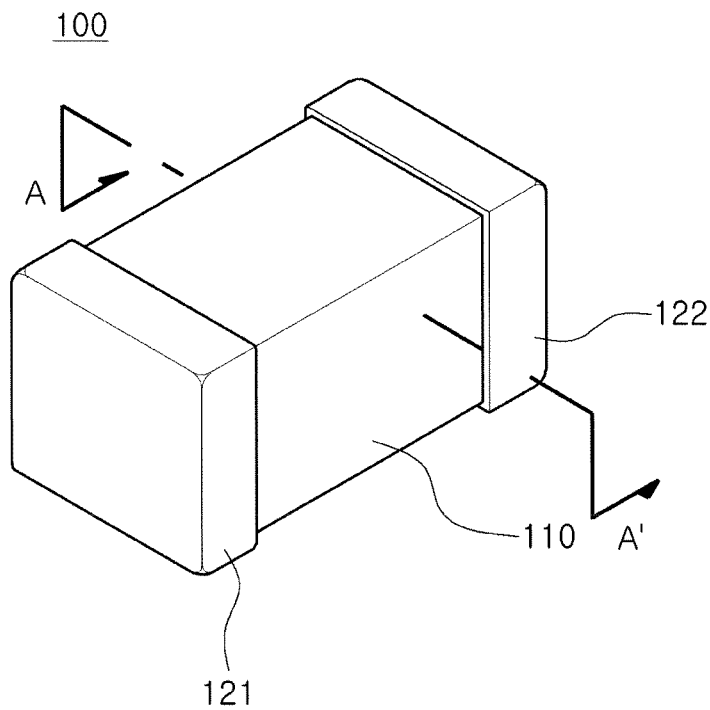
FIG. 1 is a perspective view schematically showing a multilayer ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Hereinafter, a multilayer ceramic electronic component according to an embodiment of the present invention, in particular, a multilayer ceramic capacitor, will be described with reference to the accompanying drawings, but the present invention is not limited thereto.

Figure 2:
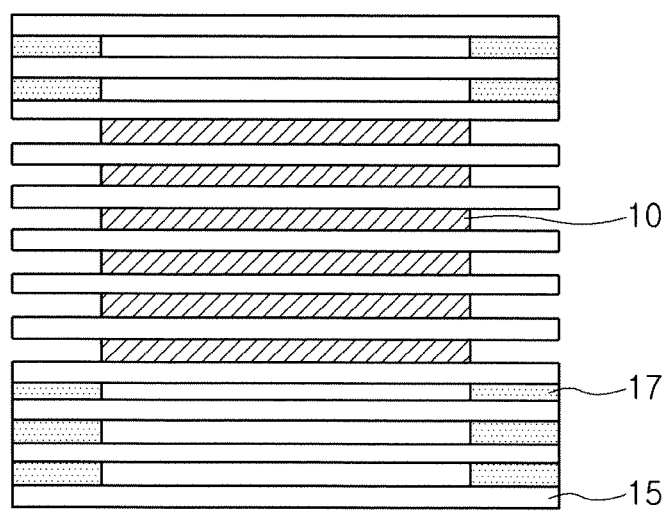
FIG. 2 is a cross-sectional view taken along line A-A' of FIG. 1, for explaining the embodiment of the present invention.

FIG. 1 is a perspective view schematically showing a multilayer ceramic capacitor according to an embodiment of the present invention; and FIG. 2 is a cross-sectional view taken along line A-A' of FIG. 1.

Referring to FIGS. 1 and 2, a multilayer ceramic electronic component 100, according to an embodiment of the present invention may include: a ceramic body 110 having dielectric layers 15 and first and second internal electrodes 10 alternately stacked therein; and first and second external electrodes 121 and 122 electrically connected to respective first and second internal electrodes 10 and formed at both ends of the ceramic body 110, wherein the ceramic body 110 includes an effective layer contributing to capacitance formation and a protective layer provided on at least one of upper and lower surfaces of the effective layer, the protective layer including one or more step absorbing layers 17 provided at both ends thereof.

According to the embodiment of the present invention, a raw material for forming the dielectric layers may be a barium titanate ($BaTiO_3$) powder, but is not limited thereto. A ceramic additive, an organic solvent, a plasticizer, a binder, a dispersant, or the like may be added thereto.

A material for forming the first and second internal electrodes 10 may be formed by using a conductive paste made of at least one of copper (Cu), nickel (Ni), silver (Ag), and silver-palladium (Ag—Pd).

The first and second external electrodes 121 and 122 may cover both end surfaces of the ceramic body 110, and may be electrically connected to the first and second internal electrodes 10 exposed through the end surfaces of the ceramic body 110.

The first and second external electrodes 121 and 122 may be formed by coating a conductive paste on both end surfaces of the ceramic body 110. Main components of the conductive paste may include a metal component such as copper (Cu), glass, an organic material, and the like.

Figure 3:
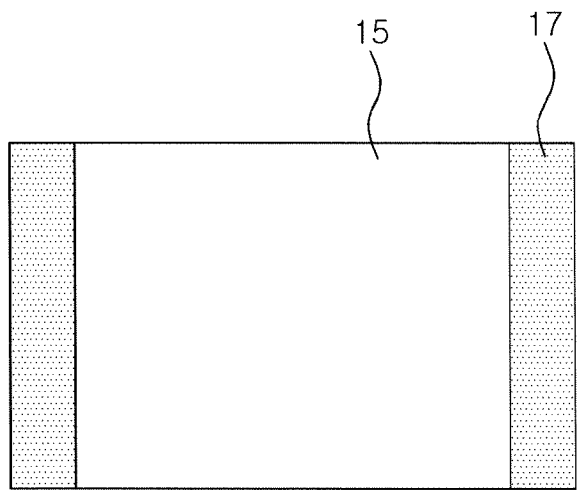
FIG. 3 is a plan view showing a protective layer of FIG. 2.
Figure 4:
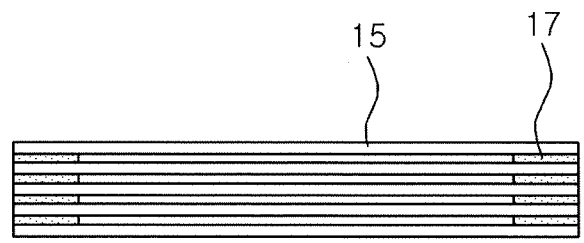
FIG. 4 is a cross-sectional view showing a structure of the protective layer of FIG. 3 in which a plurality of dielectric layers are stacked.

FIG. 3 is a plan view showing the dielectric layer and the step absorbing layer, constituting the protective layer of FIG. 2; and FIG. 4 is a cross-sectional view showing a structure of the protective layer of FIG. 3 where a plurality of dielectric layers are stacked.

Referring to FIGS. 3 and 4, the protective layer may include one or more dielectric layers 15 and one or more step absorbing layers 17.

Here, as shown in FIG. 4, the dielectric layers 15 and the step absorbing layers 17, constituting the protective layer, may be alternately stacked, but are not limited thereto.

A margin portion of an effective layer refers to a portion of the effective layer on which the internal electrodes are not formed. The step absorbing layer 17 may be formed in a region of the protective layer corresponding to the margin portion of the effective layer. That is, the step absorbing layer may be formed in the margin portion of the effective layer of the protective layer.

The step absorbing layer 17 may be formed of the same material as the dielectric layer 15, but is not limited thereto.

The step absorbing layer may have a thickness of 0.5 μm to 3 μm.

A ratio of the number of stacked step absorbing layers to the number of stacked dielectric layers included in the protective layer may be 0.5 to 1.

When the ceramic body is formed, a step occurs between an internal electrode formation region and a non-internal electrode formation region.

The step generated due to the internal electrodes may cause defects, such as, electrode spreading, cracks, delamination, and the like, in the compressing process of the ceramic body at the time of manufacturing the multilayer ceramic capacitor.

According to the embodiment of the present invention, the step absorbing layer is formed at both ends of the protective layer, so that the step between the internal electrode formation part and the non-internal electrode formation part may be decreased. As a result, defects, such as the spreading of internal electrodes, cracks, delamination, and the like, may be reduced, and thus a multilayer ceramic capacitor having excellent reliability may be realized.

Table 1 shows reliability of a multilayer ceramic capacitor according to a thickness of a step absorbing layer and a ratio of the number of stacked step absorbing layers to the number of stacked dielectric layers included in the protective layer.

TABLE 1

| Sample No. | Thickness of Step Absorbing Layer (μm) | Ratio of Number of Stacked Step Absorbing Layers to Number of Stacked Dielectric Layers Included in Protective Layer (%) | Determination |
|---|---|---|---|
| 1 | 3 | 100 | ⊚ |
| 2 | 3 | 90 | ⊚ |
| 3 | 3 | 80 | ⊚ |
| 4 | 3 | 70 | ⊚ |
| 5 | 3 | 60 | ⊚ |
| 6 | 3 | 50 | ⊚ |
| 7 | 3 | 40 | ○ |
| 8 | 2 | 100 | ⊚ |
| 9 | 2 | 90 | ⊚ |
| 10 | 2 | 80 | ⊚ |
| 11 | 2 | 70 | ⊚ |
| 12 | 2 | 60 | ⊚ |
| 13 | 2 | 50 | ○ |
| 14 | 2 | 40 | ○ |
| 15 | 1 | 100 | ⊚ |
| 16 | 1 | 90 | ⊚ |
| 17 | 1 | 80 | ⊚ |
| 18 | 1 | 70 | ⊚ |
| 19 | 1 | 60 | ○ |
| 20 | 1 | 50 | ○ |
| 21 | 1 | 40 | X |
| 22 | 0.5 | 100 | ⊚ |
| 23 | 0.5 | 90 | ⊚ |

TABLE 1-continued

| Sample No. | Thickness of Step Absorbing Layer (μm) | Ratio of Number of Stacked Step Absorbing Layers to Number of Stacked Dielectric Layers Included in Protective Layer (%) | Determination |
|---|---|---|---|
| 24 | 0.5 | 80 | ⊚ |
| 25 | 0.5 | 70 | ○ |
| 26 | 0.5 | 60 | X |
| 27 | 0.5 | 50 | X |
| 28 | 0.5 | 40 | X |
| 29 | 0.3 | 100 | X |
| 30 | 0.3 | 90 | X |
| 31 | 0.3 | 80 | X |
| 32 | 0.3 | 70 | X |
| 33 | 0.3 | 60 | X |
| 34 | 0.3 | 50 | X |
| 35 | 0.3 | 40 | X |

In Table 1, the multilayer ceramic capacitor was determined to be excellent (⊚) below 0.5% in a delamination error rate, satisfactory (○) at 0.5 to 3% in a delamination error rate, and unsatisfactory (x) when above 3% in a delamination error rate.

It can be seen from Table 1, that an error rate due to delamination was very low in the case in which the thickness of the step absorbing layer was 0.5 μm or greater, and was low in the case in which the ratio of the number of stacked step absorbing layers to the number of stacked dielectric layers included in the protective layer was 50% or higher.

According to the embodiment of the present invention, when the thickness of the step absorbing layer is 3 μm and the ratio of the number of stacked step absorbing layers to the number of stacked dielectric layers included in the protective layer is 0.5 to 1, a multilayer ceramic capacitor having excellent reliability can be realized.

A method of manufacturing a multilayer ceramic electronic component according to another embodiment of the present invention, may include: preparing ceramic green sheets; forming internal electrode patterns on the ceramic green sheets by using a conductive metal paste; forming a ceramic body including dielectric layers and first and second internal electrodes by stacking the ceramic green sheets; and forming first and second external electrodes electrically connected to respective first and second internal electrodes, wherein the ceramic body includes an effective layer contributing to capacitance formation and a protective layer provided on at least one of upper and lower surfaces of the effective layer, the protective layer including one or more step absorbing layers provided at both ends thereof.

In the method of manufacturing the multilayer ceramic electronic component according to the embodiment of the present invention, descriptions of components overlapped with those of the multilayer ceramic electronic component according to the foregoing embodiment of the present invention will be omitted.

The step absorbing layers and the internal electrode patterns may be formed on the ceramic green sheets.

The ceramic green sheets may be stacked to form a ceramic body. Here, a lamination part in which the internal electrode patterns are formed may be the effective layer contributing to capacitance formation of the ceramic body, and a lamination part in which the step absorbing layers are formed may be the protective layer of the ceramic body.

The conductive paste for forming the internal electrode patterns may be formed of at least one material selected from the group consisting of copper (Cu), nickel (Ni), silver (Ag), and sliver-palladium (Ag—Pd).

The step absorbing layer may have a thickness of 0.5 to 3 μm.

The ratio of the number of stacked step adsorbing layers to the number of stacked dielectric layers included in the protective layer may be 0.5 to 1.

The margin portion of the effective layer refers to a portion of the effective layer on which the internal electrodes are not formed. The step absorbing layer 17 may be formed in a region of the protective layer corresponding to the margin portion of the effective layer. That is, the step absorbing layer may be formed in the margin portion of the effective layer of the protective layer.

Next, the green sheet laminate is compressed at a high temperature and a high pressure, and is then cut to have a predetermined size through a cutting process, thereby forming a ceramic body.

When the laminate is compressed at a high temperature and a high pressure, an electrode material moves to a space in which the internal electrodes are not formed, to cause deformation of the ceramic green sheets and the internal electrodes, resulting in defects such as cracks, delamination, and the like. Defects caused due to the step may be increased as the number of stacked ceramic green sheets is increased.

According to the embodiment of the present invention, the step generated due to the internal electrodes can be reduced by forming the step absorbing layer in the protective layer. By including the step absorbing layer, defects such as electrode spreading, cracks, delamination, and the like occurring at the time of compressing may be reduced, and thus a high-reliability multilayer ceramic capacitor may be manufactured.

After the ceramic laminate is formed, an external electrode paste is prepared, and then may be coated on the ceramic body so as to be electrically connected to the first and second internal electrodes.

The external electrode paste is coated on the ceramic body, followed by sintering, to thereby form the first and second external electrodes.

As set forth above, according to embodiments of the present invention, a step absorbing layer is formed to thereby reduce defects such as electrode spreading, cracks, delamination, and the like, so that a multilayer ceramic electronic component having excellent reliability can be realized.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic body having dielectric layers and first and second internal electrodes alternately stacked therein; and
    first and second external electrodes electrically connected to the first and second internal electrodes and formed at both ends of the ceramic body,
    wherein the ceramic body includes an effective layer contributing to capacitance formation and a protective layer provided on at least one of upper and lower surfaces of the effective layer, the protective layer including one or more step absorbing layers provided at both ends thereof.

2. The multilayer ceramic electronic component of claim 1, wherein the step absorbing layer has a thickness of 0.5 μm to 3 μm.

3. The multilayer ceramic electronic component of claim 1, wherein a ratio of the number of stacked step adsorbing layers to the number of stacked dielectric layers included in the protective layer is 0.5 to 1.

4. The multilayer ceramic electronic component of claim 1, wherein the step absorbing layer is formed in a region of the protective layer corresponding to a margin portion of the effective layer.

5. The multilayer ceramic electronic component of claim 1, wherein the first and second internal electrodes are formed of at least one selected from the group consisting of copper (Cu), nickel (Ni), silver (Ag), and sliver-palladium (Ag—Pd).

6. A method of manufacturing a multilayer ceramic electronic component, the method comprising:
   preparing ceramic green sheets;
   forming internal electrode patterns on the ceramic green sheets by using a conductive metal paste;
   forming a ceramic body including dielectric layers and first and second internal electrodes by stacking the ceramic green sheets; and
   forming first and second external electrodes electrically connected to the first and second internal electrodes,
   wherein the ceramic body includes an effective layer contributing to capacitance formation and a protective layer provided on at least one of upper and lower surfaces of the effective layer, the protective layer including one or more step absorbing layers provided at both ends thereof.

7. The method of claim 6, wherein the step absorbing layer is formed in a region of the protective layer corresponding to a margin portion of the effective layer.

8. The method of claim 6, wherein the step absorbing layer has a thickness of 1 μm to 3 μm.

9. The method of claim 6, wherein a ratio of the number of stacked step adsorbing layers to the number of stacked dielectric layers included in the protective layer is 0.5 to 1.

10. The method of claim 6, wherein the conductive metal paste includes at least one selected from the group consisting of copper (Cu), nickel (Ni), silver (Ag), and sliver-palladium (Ag—Pd).

\* \* \* \* \*